(12) United States Patent
Cabot et al.

(10) Patent No.: US 7,266,626 B2
(45) Date of Patent: Sep. 4, 2007

(54) METHOD AND APPARATUS FOR CONNECTING AN ADDITIONAL PROCESSOR TO A BUS WITH SYMMETRIC ARBITRATION

(75) Inventors: Mason B. Cabot, San Francisco, CA (US); Frank T. Hady, Portland, OR (US); John C. Beck, Northboro, MA (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 10/953,162

(22) Filed: Sep. 28, 2004

(65) Prior Publication Data

US 2006/0069838 A1   Mar. 30, 2006

(51) Int. Cl.
   *G06F 13/00* (2006.01)
(52) U.S. Cl. .................. 710/107; 710/114; 710/116
(58) Field of Classification Search .............. 710/107, 710/111, 113, 116, 117, 119, 120, 124, 309, 710/200, 240–244
   See application file for complete search history.

(56) References Cited

U.S. PATENT DOCUMENTS 5,261,109 A * 11/1993 Cadambi et al. ........... 710/111
5,581,782 A * 12/1996 Sarangdhar et al. ........ 710/119
5,901,297 A * 5/1999 Fisch et al. ................ 710/114
5,935,230 A * 8/1999 Pinai et al. ................ 710/111
6,654,833 B1 * 11/2003 LaBerge .................... 710/107

OTHER PUBLICATIONS

Intel P6 Family of Processors, Arbitration Signals, section 3.2.2, Sep. 1998.*
Intel Corporation, "Intel 450KX/GX PCIset", Intel Product Specification, 180 pages, published 1996.

* cited by examiner

*Primary Examiner*—Khanh Dang
(74) *Attorney, Agent, or Firm*—Blakely, Sokoloff, Taylor & Zafman LLP

(57) ABSTRACT

A method and apparatus for adding an additional agent to a set of symmetric agents in a bus-based system is disclosed. In one embodiment, the number of symmetric agents in the system is fixed. An additional agent may monitor the symmetric arbitration of the symmetric agents, and at a given stage of the symmetric arbitration assert a priority agent bus request. The priority agent bus request may be shared with another priority agent. This may permit the additional agent to access the bus in a fair manner that behaves as though it were an additional symmetric agent in the system.

19 Claims, 7 Drawing Sheets

METHOD AND APPARATUS FOR CONNECTING AN ADDITIONAL PROCESSOR TO A BUS WITH SYMMETRIC ARBITRATION

FIELD

The present disclosure relates generally to bus-based multiprocessor systems, and more specifically to bus-based multiprocessor systems with symmetric arbitration for bus access.

BACKGROUND

Bus-based multiprocessor systems are commonly used in current architectures. Using a bus allows several processors or other devices (all of which may be called "agents" of the bus) to share system resources such as system memory and input/output (I/O) devices. An example of such a bus is the Front Side Bus (FSB) designed for use with Pentium® class compatible microprocessors such as those produced by Intel® Corporation. Generally only one of the processors or other agents may use the bus at a given time. If a single agent requests access to the bus, it may use it. However, often multiple agents request access to the bus at roughly the same time. In this case, a process of determining which agent may have access, called an "arbitration", may be performed.

One form of arbitration, called priority arbitration, gives to priority agents the ability to issue a bus request that overrides other agents' bus requests. Priority arbitration may be useful for agents, such as I/O devices, that require quick access but not necessarily with high bandwidth requirements. Priority agents may use a relatively simple request and grant logic to gain access to the bus. Another form of arbitration, called symmetric arbitration, permits symmetric agents to arbitrate amongst themselves in a distributed fashion and grant bus access in a fair manner. This fair manner may include round-robin grants of access. Symmetric agents were originally so labeled because they contain state machines of a common design, therefore permitting them to decide among themselves which symmetric agent should next have bus access. Symmetric arbitration may be useful for agents, such as processors, that may have higher bandwidth requirements but may not need immediate access to the bus. Busses may support both priority arbitration and symmetric arbitration for various connected agents.

One difficulty that arises when using a bus using symmetric arbitration is that the number of symmetric agents may be limited. Special symmetric agent bus request lines may be used, and a limited number of these may be designed into a given bus environment. This limited number of symmetric agent bus request lines may be designed into the processors themselves. Therefore, in situations when it may be necessary to add just a single additional processor to such a system, the other processors and agents may need extensive redesign and manufacture. This may be unnecessarily costly and time consuming.

BRIEF DESCRIPTION OF THE DRAWINGS

The present invention is illustrated by way of example, and not by way of limitation, in the figures of the accompanying drawings and in which like reference numerals refer to similar elements, and in which.

DETAILED DESCRIPTION

The following description describes techniques for permitting the addition of an additional agent into a bus-based system with a priority agent and a fixed number of symmetric agents. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of a multiple processor implementations of Pentium® compatible processors such as those produced by Intel® Corporation. However, the invention may be practiced with other kinds of processors, such as an Itanium® Processor Family compatible processor or an X-Scale® family compatible processor, or indeed of generalized bus agents that may not be processors.

Figure 1:
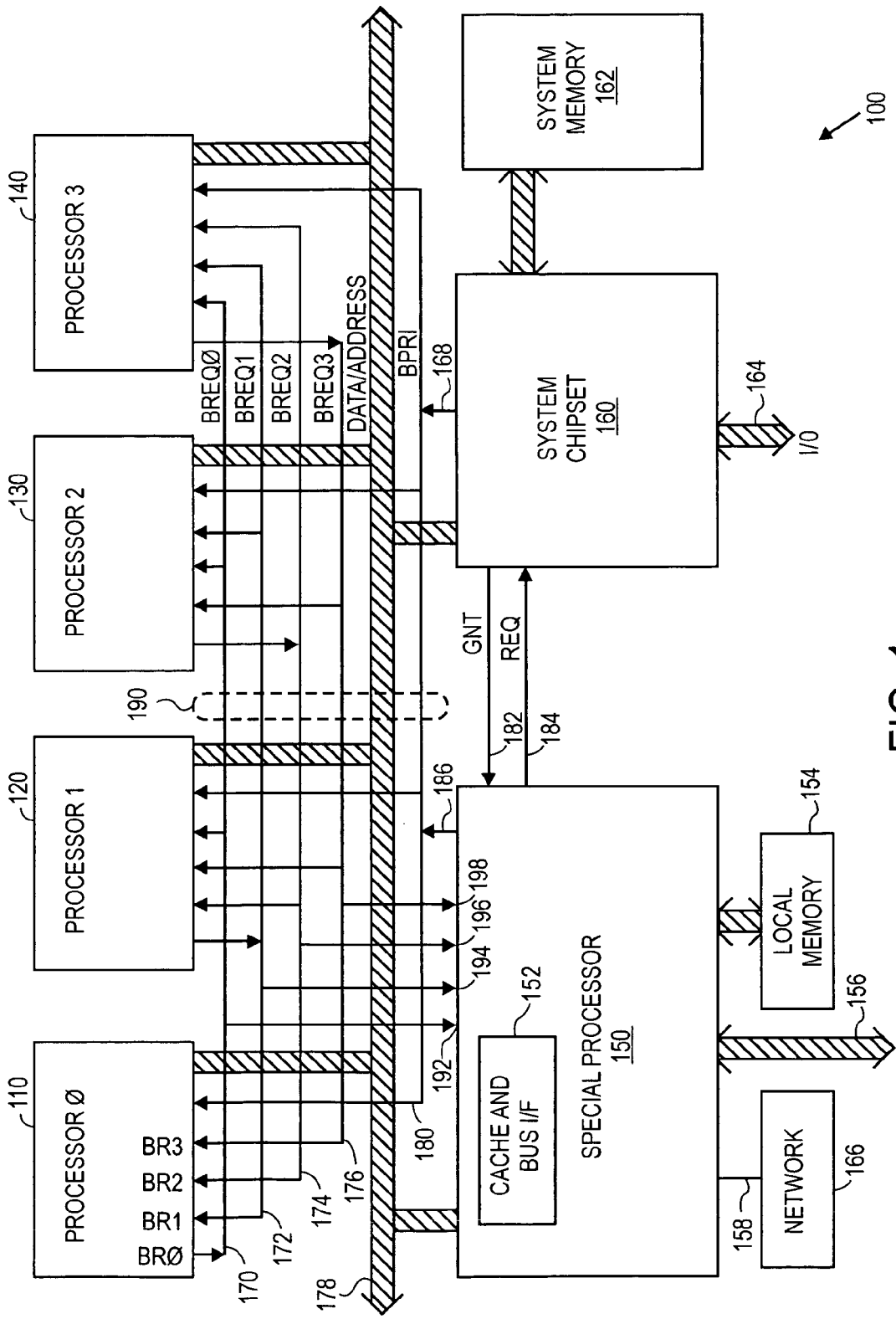
FIG. 1 is a system schematic diagram of an additional processor connected to a bus with symmetric arbitration, according to one embodiment.

Referring now to FIG. 1, a system schematic diagram of an additional processor connected to a bus with symmetric arbitration is shown, according to one embodiment. Four processors, processor 0 110, processor 1 120, processor 2 130, and processor 3 140 are shown connected via bus 190 to a system chipset 160. In varying embodiments, the processors may be heterogeneous or homogeneous. In other embodiments, other kinds of processors may be used, or other forms of bus agents attached in their place. The system chipset 160 may be used to connect the processors to a system memory 162. Processors 0 through 3 (110-140) may have internal caches, and may share a cache-coherency domain over system memory 162.

In order to gain access to the use of bus 190 for transferring data, the various agents may arbitrate the use of the bus 190 among themselves. A series of symmetric agent bus request signals, BREQ 0 170, BREQ 1 172, BREQ 2 174, and BREQ 3 176, may be used by the processors to gain the use of the bus. In one embodiment, each of the processors 0 through 3 may drive a corresponding symmetric agent bus request signal BREQ 0 thorough 3. The other processors may monitor these lines. An uncontested issuance of a symmetric agent bus request signal may permit the associated processor to use the bus 190 for a period of time. When more than one symmetric agent bus requests are asserted, or when a processor is already using the bus when a symmetric agent bus request is asserted, one of the processors may be permitted to use the bus based upon a fair, round-robin arbitration.

In one embodiment, during the time period of system reset the processors may sample the symmetric agent bus request signals BREQ 0 through BREQ 3 to determine how many processors are present. Once this is determined, virtual processor numbers may be assigned, and the processors may arbitrate contested symmetric agent bus requests by considering the virtual number of the agent that previously had ownership, known as a rotating identification (rotating ID). If the rotating ID was 0, then the processor with virtual number 1 would get the next access: if the rotating ID was 1, then the processor with virtual number 2 would get the next access. A rollover at the end occurs, when if the rotating ID was 3, then the processor with virtual number 0 would get the next access. In other embodiments, other fair arbitration methods could be used, and the symmetric agent bus request signals could be configured differently. For simplicity in discussing bus arbitrations, in the rest of this disclosure the rotating ID will be the same as the physical processor number.

The system chipset 160 may receive asynchronous input/output (I/O) data on an I/O bus 164. For this and other reasons, the system chipset 160 may not seek to access the bus 190 via a symmetric agent bus request, but instead may seek to access the bus 190 by asserting a priority agent bus request BPRI 180. In one embodiment, when priority agent bus request BPRI 180 is asserted by an agent, that agent gets the use of the bus 190 next, regardless of the status of the symmetric agent bus requests. In other embodiments, the agent asserting priority agent bus request BPRI 180 may not get the use of the bus 190 unless it is otherwise idle.

In one embodiment, an additional agent may be added to the FIG. 1 system. In one embodiment, this may be special processor 150. Special processor 150 may have its own local memory 154, I/O bus 156, and network connection 158 to a network 166. In addition, special processor 150 may include a cache and bus interface 152 permitting it to connect with bus 190 and be included in the cache coherency domain shared with processor 0 110 through processor 3 140. In the FIG. 1 system, all of the symmetric agent bus requests have been associated with one of the processors, processor 0 110 through processor 3 140. There are no extra symmetric agent bus request signal lines available for use by special processor 150. There is also no unassigned priority agent bus request line for the special processor 150 to use. Therefore, the special processor 150 may share the use of priority agent bus request BPRI 180 with system chipset 160. In one embodiment, special processor 150 may drive BPRI 180 via interface 186 and system chipset 160 may drive BPRI 180 via interface 168.

The priority agent bus request BPRI 180 may be designed to support a single priority agent. In general there may be no bus mechanism for arbitrating among multiple agents using the priority agent bus request BPRI 180. In order to arbitrate contended use of BPRI 180, an arbitration interface may be used between special processor 150 and system chipset 160. In one embodiment, this arbitration interface may include the ability to issue a request on REQ signal line 184 and issue a grant on GNT signal line 182. When the special processor 150 wishes to issue BPRI 180, it first may issue a request on REQ signal line 184 to system chipset 160. If the system chipset 160 does not need to access the bus 190 (via interface 168), then the system chipset 160 may issue a grant signal on the GNT signal line 182. After receiving the grant signal, the special processor 150 may then issue a priority agent bus request BPRI 180 on interface 186. If, however, the system chipset 160 does need to access the bus 190, then the issuance of the grant signal on the GNT signal line 182 may be delayed until the system chipset 160 has finished its use of the bus 190. In other embodiments, the system chipset 160 may have a lower priority than the special processor 150 rather than the higher priority discussed above, or other inter-agent arbitration methods may be used.

If the special processor 150 used the priority agent bus request through interface 186 as discussed above, it would have access to the bus 190 whenever it wished on a priority basis. However this may impact system performance. The special processor 150 could consume much more than its fair share of the bus bandwidth (in other words "hog" the bus) should it continually continue to assert the priority agent bus request BPRI 180 via interface 186. Therefore, in one embodiment the special processor 150 may monitor the symmetric agent bus request lines BREQ0 170 through BREQ3 176 using monitor interfaces 192, 194, 196, 198. In other embodiments, the special processor 150 (or other agent in its place) may monitor a differing number of symmetric agent bus request lines.

When a system reset or other similar event occurs, the various processors 0 through 3 (110 through 140) may each assert the symmetric agent bus request line that it drives. In this manner, the processors may determine how many processors (or other agents) are present and configured for use with the symmetric agent bus request lines BREQ0 170 through BREQ3 176. The processors may then initiate the round-robin symmetric bus arbitration process. By monitoring this process using monitor interfaces 192 through 198, the logic of the special processor 150 may determine how many processors are present that are using the symmetric agent bus request lines BREQ0 170 through BREQ3 176. Once the logic of the special processor 150 know this quantity, the logic may additionally determine the order in which the processors configured for use with the symmetric agent bus request lines BREQ0 170 through BREQ3 176 may conduct round-robin arbitration. For example, if only three processors 110, 120, 130 were physically present in the system, only configured symmetric agent bus request lines BREQ0 170 through BREQ2 174 could be asserted. Then, in this particular example, the round-robin order could be processor 0, then processor 1, then processor 2, and finally back to processor 0 again.

Once special processor 150 knows the current round-robin order, it may continue to monitor symmetric agent bus request lines BREQ0 170 through BREQ3 176 using monitor interfaces 192, 194, 196, 198. Logic of the special processor 150 may then select one of the processors 110, 120, 130, 140, to follow in bus access each time through the round-robin process. For example, special processor 150 may decide to request a bus access following the bus access period of processor 2 130. After processor 2 130 completes its bus access, normally processor 3 140 would follow. But special processor 150 may use the priority agent bus request BPRI 180 to gain access to the bus before processor 3 140 may take its turn.

A sequence of events could, in one embodiment, be as follows. When special processor 150 requires a bus access, it may wait until processor 2 130 next has bus access in the round-robin scheme. When processor 2 130 relinquishes the bus 190, and, whether or not processor 3 140 issues the symmetric agent bus request BREQ3 176, special processor 150 may request the use of the priority agent bus request BPRI 180 by issuing a request on the REQ signal line 184 to system chipset 160. If system chipset 160 doesn't itself require a bus access, system chipset 160 may then respond with a grant signal on the GNT signal line 182. Upon receiving the grant signal on the GNT signal line 182, special processor 150 may then issue a priority agent bus request BPRI 180 from interface 186. This will enable special processor 150 to gain access to the bus 190, cutting in front of the normally-scheduled round-robin bus access for processor 3 140.

When special processor 150 finishes its bus access, it may release the priority agent bus request BPRI 180. This may permit processor 3 140 to issue the symmetric agent bus request BREQ3 176 and take its round-robin turn at bus access if required. In this manner, special processor 150 may participate in the round-robin arbitration of the symmetric agents even though it does not have a symmetric agent bus request line. It may not matter which of the symmetric agents that the special processor 150 follows: in various embodiments the special processor 150 may follow any of them that it wishes. To introduce a helpful terminology for this concept, the various processors using the symmetric agent bus requests may each be said to have a "slot" of time in the round-robin arbitration for the bus, and the special processor 150 may be said to then force a "virtual slot" in this round-robin arbitration.

Figure 2:
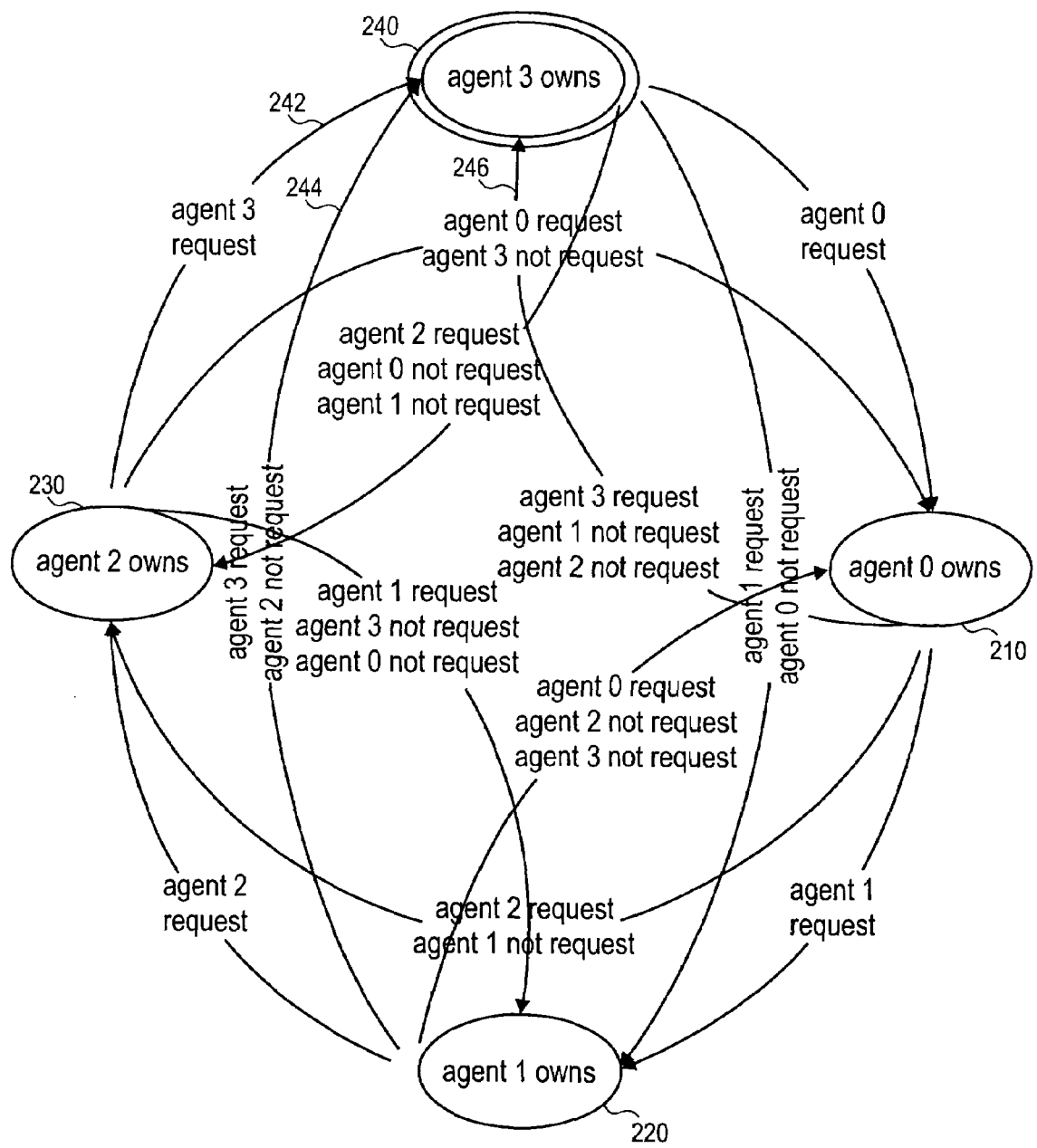
FIG. 2 is a state diagram of arbitrating bus grants, according to one embodiment.

Referring now to FIG. 2, a state diagram of arbitrating bus grants is shown, according to one embodiment. There are four states shown: "agent 0 owns" 210, "agent 1 owns" 220, "agent 2 owns" 230, and "agent 3 owns" 240. This corresponds to the four symmetric agent system shown in FIG. 1. FIG. 2 shows some of the transitions that may occur in a "fair" round-robin arbitration among symmetric agents. For example, the "agent 3 owns" state 240 may be entered from any of the other states. It may be entered via path 242 from "agent 2 owns" 230 if agent 3 makes a bus request. It may be entered via path 244 from "agent 1 owns" 220 if agent 3 makes a bus request and agent 2 does not make a bus request. And it may be entered via path 246 from "agent 0 owns" 210 if agent 3 makes a bus request and agents 1 and 2 do not make a bus request. Each of the four states may be entered via the three corresponding paths.

Figure 3:
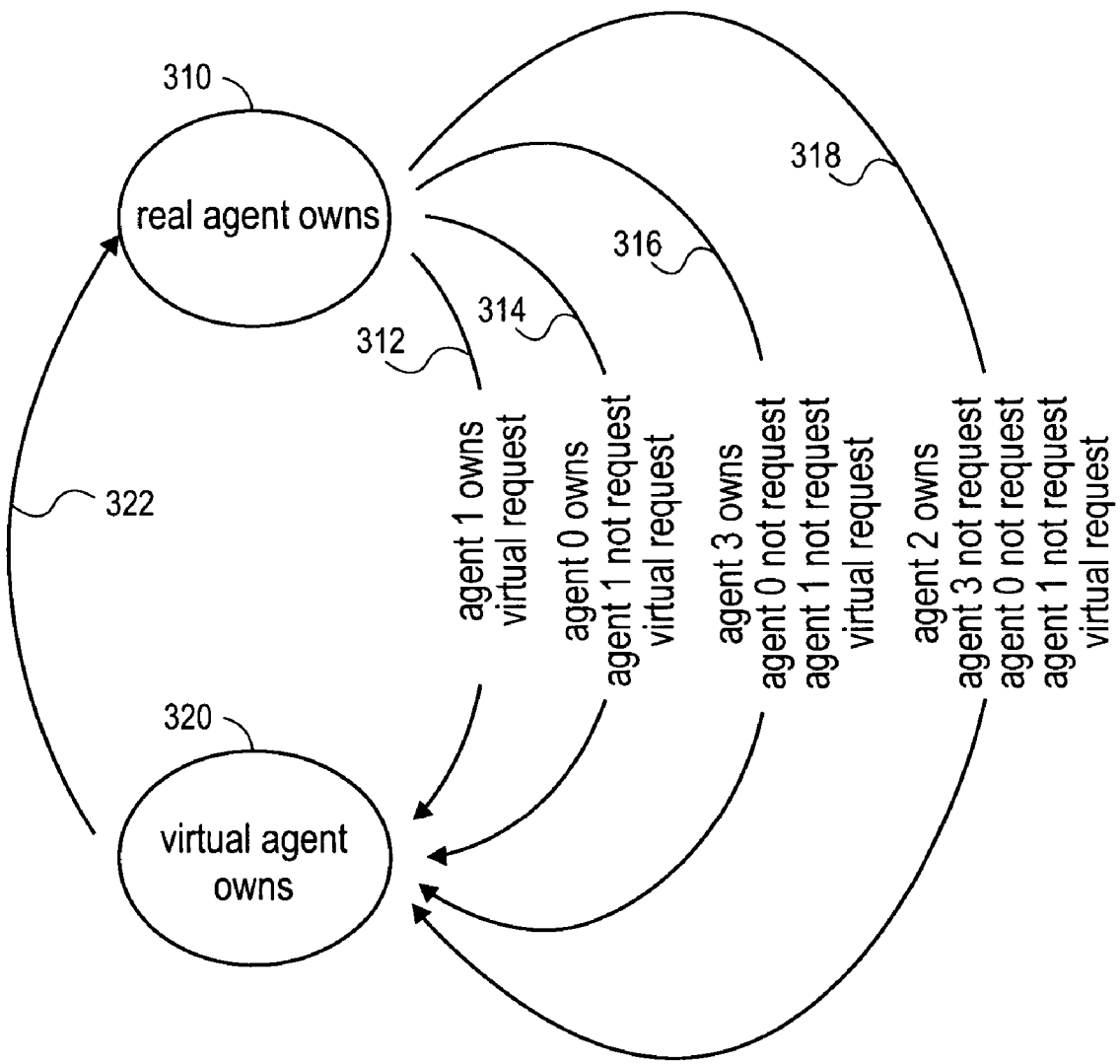
FIG. 3 is a state diagram of arbitrating bus grants between real and virtual symmetric agents, according to one embodiment.

Referring now to FIG. 3, a state diagram of arbitrating bus grants between real and virtual symmetric agents is shown, according to one embodiment. Here the expression "real symmetric agent" may mean an agent that may drive a symmetric agent bus request line, and "virtual symmetric agent" may mean an agent that cannot drive a symmetric agent bus request line but may participate in the "fair" round-robin arbitration as discussed above for special processor 150 of FIG. 1. In the FIG. 3 embodiment, the virtual symmetric agent may take a "virtual slot" between symmetric agents 1 and 2.

FIG. 3 shows two states, "real agent owns" 310 and "virtual agent owns" 320. The state "virtual agent owns" 320 may be entered via one of four paths. "Virtual agent owns" 320 may be entered via path 312 if agent 1 previously owned the bus access and if the virtual agent issued a priority agent bus request. "Virtual agent owns" 320 may be entered via path 314 if agent 0 previously owned the bus access, agent 1 did not make a bus request, and if the virtual agent issued a priority agent bus request. "Virtual agent owns" 320 may be entered via path 316 if agent 3 previously owned the bus access, agents 0 and 1 did not make a bus request, and if the virtual agent issued a priority agent bus request. Finally, "virtual agent owns" 320 may be entered via path 318 if agent 2 previously owned the bus access, agents 0, 1, and 3 did not make a bus request, and if the virtual agent issued a priority agent bus request. In any case, when the virtual agent releases the bus access, the "real agent owns" 310 state is always entered via path 322.

Figure 4:
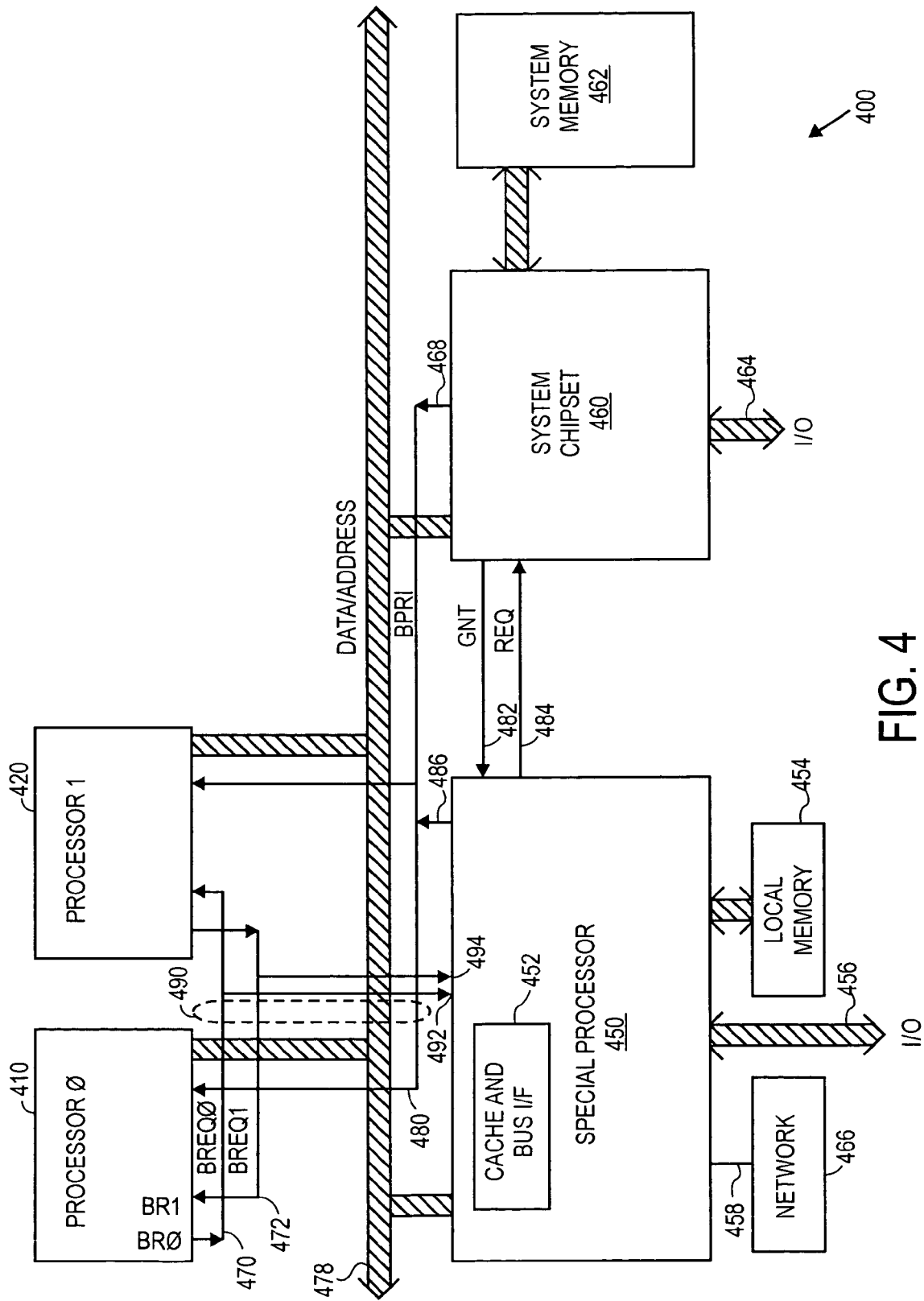
FIG. 4 is a system schematic diagram of an additional processor connected to a bus with symmetric arbitration, according to one embodiment of the present disclosure.

Referring now to FIG. 4, a system schematic diagram of an additional processor connected to a bus with symmetric arbitration is shown, according to one embodiment of the present disclosure. The FIG. 4 embodiment may be similar to that shown in FIG. 1 with a difference being that only up to two processors, processor 0 410 and processor 1 420, are supported in the FIG. 4 embodiment.

Special processor 450 may again drive a shared priority agent bus request BPRI 480 via interface 486, and request the use of this priority agent bus request BPRI 480 using a request on REQ signal line 484 and receiving a grant on GNT signal line 482. Here special processor 450 may only require two monitor interfaces 492, 494 to monitor activity on the symmetric agent bus request lines BREQ0 470 and BREQ1 472. By monitoring these lines, special processor 450 may assert the priority agent bus request BPRI 480 line at a time subsequent to either processor 0 410 or processor 1 420 relinquishing the bus access.

When special processor 450 requires a bus access, it may wait until processor 0 410 next has bus access in the round-robin scheme. When processor 0 410 relinquishes the bus 490, and, whether or not processor 1 420 issues the symmetric agent bus request BREQ1 472, special processor 450 may request the use of the priority agent bus request BPRI 480 by issuing a request on the REQ signal line 484 to system chipset 460. If system chipset 460 doesn't itself require a bus access, system chipset 460 may then respond with a grant signal on the GNT signal line 482. Upon receiving the grant signal on the GNT signal line 482, special processor 450 may then issue a priority agent bus request BPRI 480 from interface 486. This will enable special processor 450 to gain access to the bus 490, cutting in front of the normally-scheduled round-robin bus access for processor 1 420.

When special processor 450 finishes its bus access, it may release the priority agent bus request BPRI 480. This may permit processor 1 420 to issue the symmetric agent bus request BREQ1 472 and take its round-robin turn at bus access if required. In this manner, special processor 450 may participate in the round-robin arbitration of the symmetric agents even though it does not have a symmetric agent bus request line. It does not matter which of the symmetric agents that the special processor 450 follows: in various embodiments the special processor 450 may follow either processor 0 410 or processor 1 420.

Figure 5:
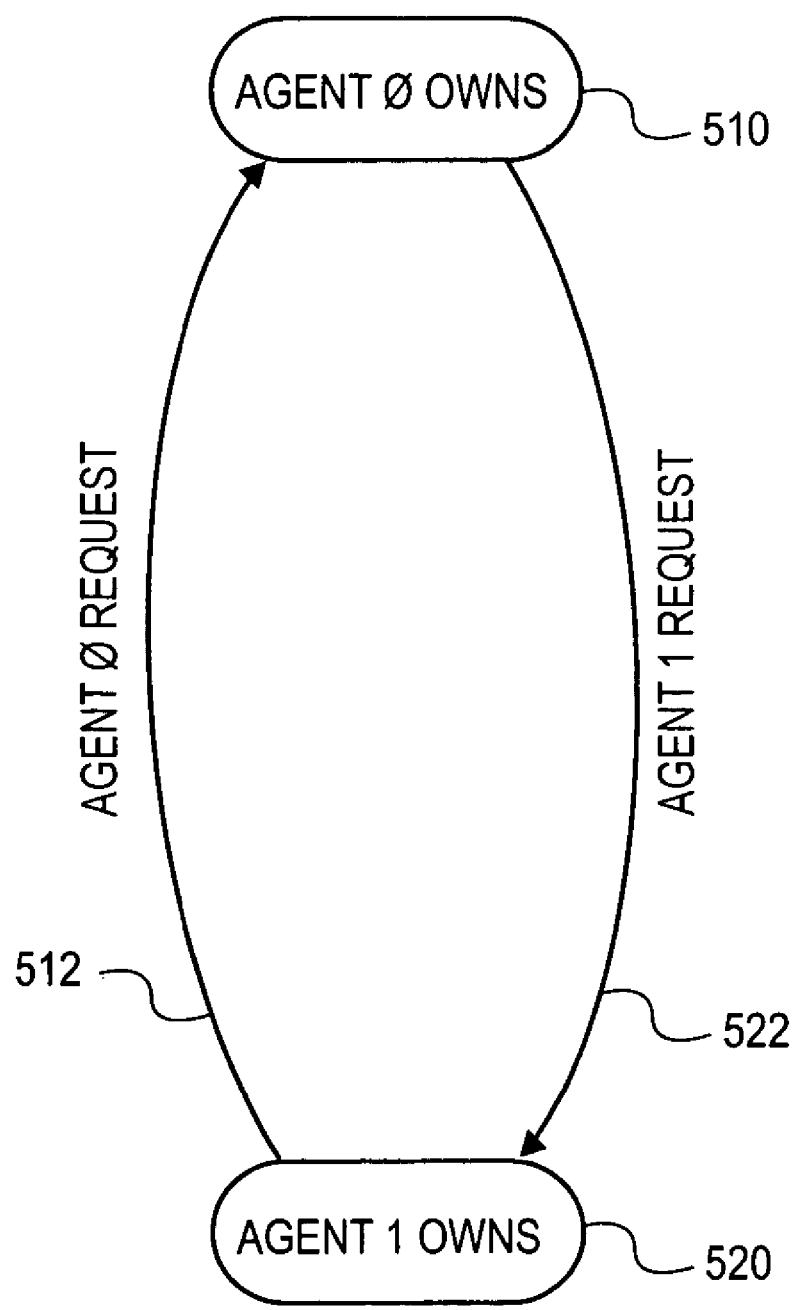
FIG. 5 is a state diagram of arbitrating bus grants, according to one embodiment of the present disclosure.

Referring now to FIG. 5, a state diagram of arbitrating bus grants is shown, according to one embodiment of the present disclosure. There are only two states shown here: "agent 0 owns" 510 and "agent 1 owns" 520. This corresponds to the two symmetric agent system shown in FIG. 4. The state "agent 0 owns" 510 may be entered from "agent 1 owns" 520 via path 512 when agent 0 makes a bus request. The state "agent 1 owns" 520 may be entered from "agent 0 owns" 510 via path 522 when agent 1 makes a bus request.

Figure 6:
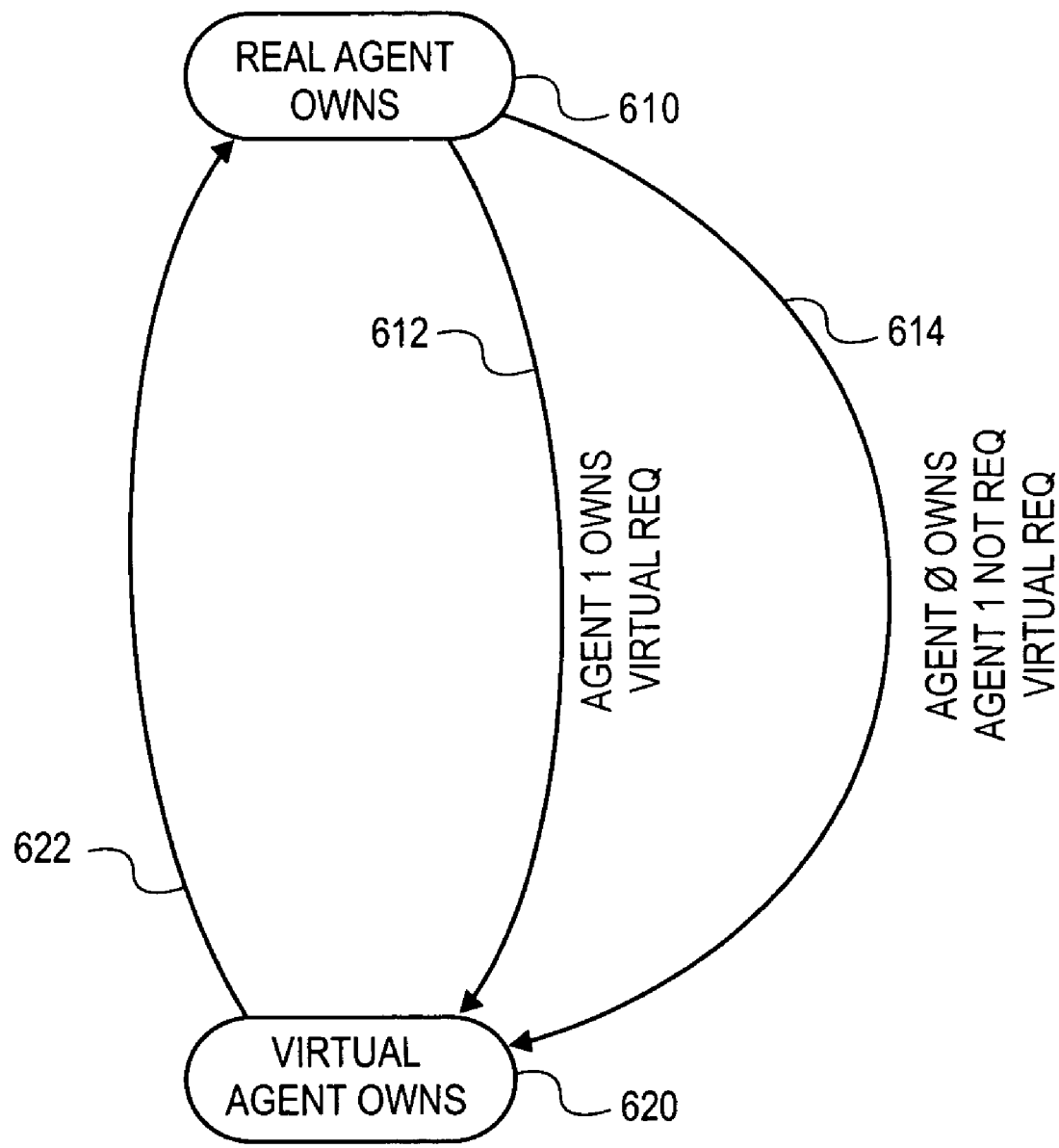
FIG. 6 is a state diagram of arbitrating bus grants between real and virtual symmetric agents, according to one embodiment of the present disclosure.

Referring now to FIG. 6, a state diagram of arbitrating bus grants between real and virtual agents is shown, according to one embodiment of the present disclosure. In this embodiment, the virtual agent asserts the priority agent bus request subsequent to symmetric agent 1 relinquishing the bus. In other embodiments, the virtual agent may assert the priority agent bus request subsequent to symmetric agent 0 relinquishing the bus. The state "virtual agent owns" 620 may be entered via one of two paths. "Virtual agent owns" 620 may be entered via path 612 if agent 1 previously owned the bus access and if the virtual agent issued a priority agent bus request. And "virtual agent owns" 620 may be entered via path 614 if agent 0 previously owned the bus access, agent 1 did not make a bus request, and if the virtual agent issued a priority agent bus request. In either case, when the virtual agent releases the bus access, the "real agent owns" 610 state is always entered via path 622.

Figure 7:
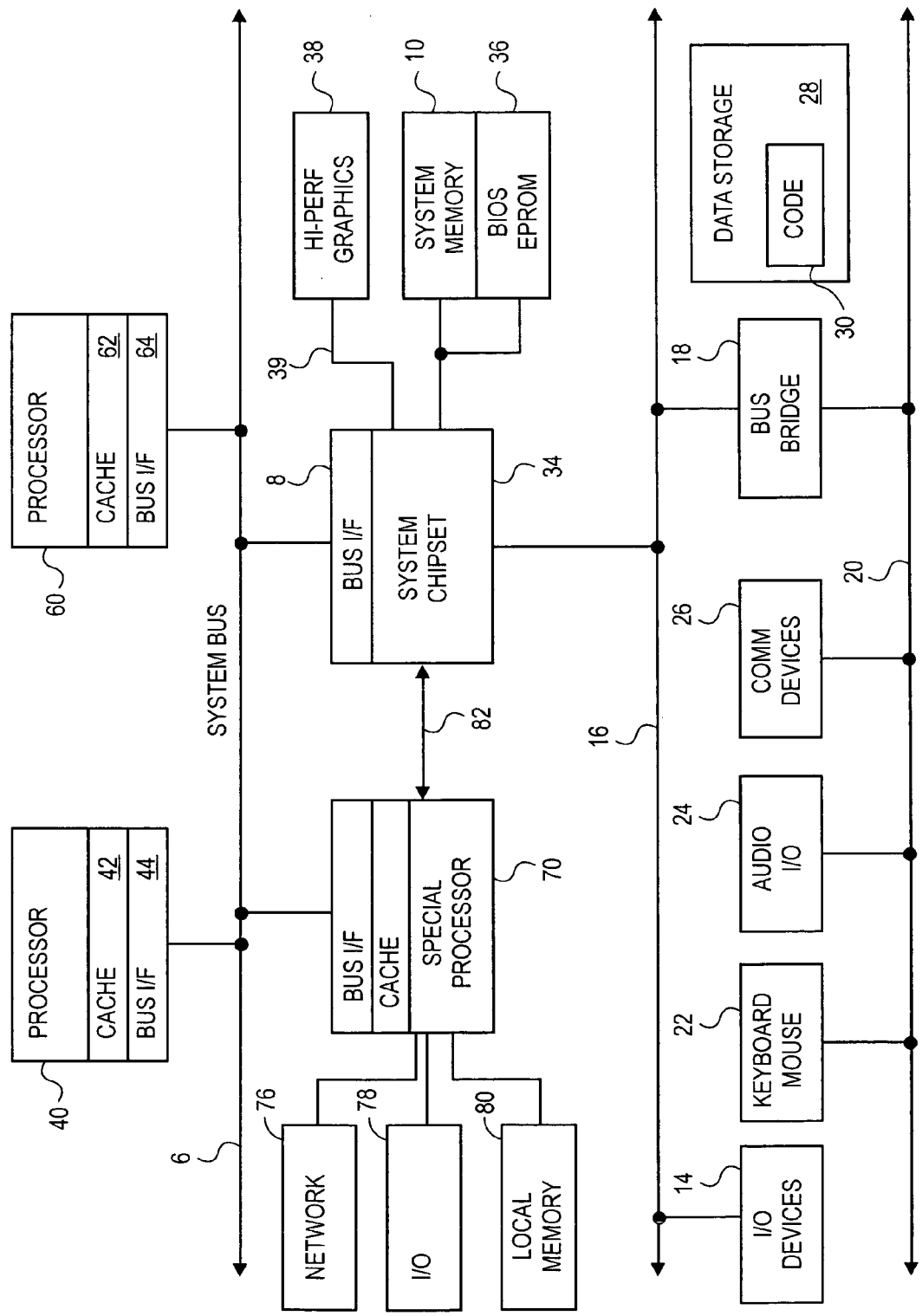
FIG. 7 is a system schematic diagram of systems including a processor and chipset supporting virtual agents, according to one embodiment of the present disclosure.

Referring now to FIG. 7, a system schematic diagram of systems including a processor and chipset supporting virtual agents is shown, according to one embodiment of the present disclosure. The FIG. 7 system may include several processors, of which only two, processors 40, 60 are shown for clarity. Processors 40, 60 may include level one caches 42, 62. The FIG. 7 system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 7 embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

In the FIG. 7 system, bus bridge 32 may permit data exchanges between system bus 6 and bus 16, which may in some embodiments be a industry standard architecture (ISA) bus or a peripheral component interconnect (PCI) bus. In the system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A special agent, comprising:
   a first interface to exchange arbitration signals with a priority agent;
   a second interface communicatively coupled to a first symmetric agent to receive a first symmetric agent bus request signal indicating that the first symmetric agent is requesting access to a bus; and
   a third interface communicatively coupled to the priority agent to issue a priority agent bus request signal to request access to the bus for the special agent in lieu of the priority agent when the priority agent indicates it does not require the bus via the arbitration signals on the first interface and the first symmetric agent releases the first symmetric bus request signal on the second interface;
   wherein the special agent to share use of the priority agent bus request signal with the priority agent for purposes of requesting access to the bus for either of the special agent and the priority agent.

2. The special agent of claim 1, wherein said first interface includes a grant signal line to receive a grant of usage of the priority agent bus request signal from the priority agent.

3. The special agent of claim 1, further comprising a fourth interface communicatively coupled to the first symmetric agent and a second symmetric agent to receive a second symmetric agent bus request signal indicating that the second symmetric agent is requesting access to the bus.

4. The special agent of claim 3, wherein the special agent to determine a quantity of connected symmetric agents by examining signals on the second interface and the fourth interface at reset.

5. The special agent of claim 4, wherein the special agent to issue the priority agent bus request signal when the quantity is two and both of the first symmetric agent bus request signal on the second interface and second symmetric agent bus request signal on the fourth interface are released.

6. The special agent of claim 4, wherein the special agent to issue the priority agent bus request signal when the quantity is two, the first symmetric agent bus request signal on the second interface is released, and the second symmetric agent bus request signal on the fourth interface is asserted.

7. A system, comprising:
   a first symmetric agent to issue a first symmetric agent bus request signal to request access to a bus;
   a special agent communicatively coupled to the first symmetric agent via the bus to receive the first symmetric agent bus request signal and to issue a priority agent bus request signal to request priority access to the bus when the first symmetric agent both releases the bus and de-asserts the first symmetric agent bus request signal; and
   a priority agent communicatively coupled to the first symmetric agent and the special agent via the bus to grant permission to the special agent to issue the priority agent bus request signal;
   wherein the priority agent bus request signal is shared between the special agent and the priority agent for purposes of requesting access to the bus for either of the special agent and the priority agent.

8. The system of claim 7, wherein the priority agent to grant permission to the special agent via a grant signal line to issue the priority agent bus request signal.

9. The system of claim 7, further comprising a second symmetric agent to issue a second symmetric agent bus request signal to request access to the bus, wherein the special agent to receive the second symmetric agent bus request signal.

10. The system of claim 9, wherein the special agent to determine a quantity of connected symmetric agents by determining if it receives the first symmetric agent bus request signal and the second symmetric agent bus request signal at reset.

11. The system of claim 10, wherein the special agent to issue the priority agent bus request signal when the quantity is two and both of the first symmetric agent bus request signal and said second symmetric agent bus request signal are released.

12. The system of claim 10, wherein the special agent to issue the priority agent bus request signal when the quantity is two, the first symmetric agent bus request signal is released, and second symmetric agent bus request signal is asserted.

13. The system of claim 7, wherein the priority agent to couple to an input/output bus, and further comprising an audio input/output logic coupled to the input/output bus.

14. A method, comprising:
monitoring, by a special agent, a first symmetric agent bus request interface for a first symmetric agent bus request signal that requests access to a bus from a first symmetric agent;
arbitrating, by the special agent, a priority agent bus request interface with a priority agent; and
issuing, by the special agent, a priority agent bus request signal to access the bus on the priority agent bus request interface when the monitoring shows the first symmetric agent has released the bus by de-asserting the first symmetric bus request signal;
wherein the priority agent bus request signal is shared between the special agent and the priority agent for purposes of requesting access to the bus for either of the special agent and the priority agent.

15. The method of claim 14, wherein the arbitrating includes granting a use of the priority agent bus request signal to the special agent by the priority agent.

16. The method of claim 14, further comprising monitoring a second symmetric agent bus request interface for a second symmetric agent bus request signal to request access to the bus from a second symmetric agent.

17. The method of claim 14, further comprising determining a quantity of connected symmetric agents using results of the monitoring of the first symmetric agent bus request interface and the second symmetric agent bus request interface.

18. The method of claim 17, wherein the issuing of the priority agent bus request signal occurs if the quantity is two and if both of the first symmetric agent bus request signal and the second symmetric bus request signal are released.

19. The method of claim 17, wherein the issuing of the priority agent bus request signal occurs if the quantity is two and if the first symmetric agent bus request signal is released and the second symmetric bus request signal is asserted.

* * * * *